United States Patent [19]

Schmid et al.

[11] Patent Number: 4,866,359
[45] Date of Patent: Sep. 12, 1989

[54] APPARATUS TO PROVIDE TEMPERATURE CONTROLLED WINDSHIELD WIPER POSITIONS FOR MOTOR VEHICLES

[75] Inventors: Eckhardt Schmid, Brackenheim; Wolfgang Scholl, Gemmrigheim, both of Fed. Rep. of Germany

[73] Assignee: SWF Auto-Electric GmbH, Bietigheim-Bissingen, Fed. Rep. of Germany

[21] Appl. No.: 238,349
[22] PCT Filed: Nov. 2, 1987
[86] PCT No.: PCT/EP87/00655
 § 371 Date: Jun. 30, 1988
 § 102(e) Date: Jun. 30, 1988
[87] PCT Pub. No.: WO88/03485
 PCT Pub. Date: May 19, 1988

[30] Foreign Application Priority Data
 Nov. 6, 1986 [DE] Fed. Rep. of Germany ....... 3637921

[51] Int. Cl.⁴ ............................................... B60S 1/08
[52] U.S. Cl. .............................. 318/471; 318/DIG. 2; 15/250.17
[58] Field of Search ......... 318/443, 444, 471, DIG. 2; 15/250 C, 250.13, 250.16, 250.17, 250.06

[56] References Cited

U.S. PATENT DOCUMENTS

| 4,387,290 | 6/1983 | Yasuda | 15/250.07 X |
| 4,455,511 | 6/1984 | Stewart | 318/DIG. 2 X |

FOREIGN PATENT DOCUMENTS

| 3627561 | 10/1987 | Fed. Rep. of Germany | 15/250.17 |
| 3734814 | 5/1988 | Fed. Rep. of Germany | 15/250.16 |
| 61-247542 | 11/1986 | Japan | 15/250.13 |

Primary Examiner—Bentsu Ro
Attorney, Agent, or Firm—Robert P. Seitter

[57] ABSTRACT

A wiper system is disclosed for motor vehicles in which during normal wiper operation the windshield wiper moves back and forth between two reversing positions, but stops in a depressed parking position outside the wiping area after the power switch is turned off. According to the invention the parking position is changed in dependence on the temperature so that in low temperatures the windshield wiper does not enter the gap between the hood and the windshield. This prevents the wiper from being blocked by ice or snow in the gap. At higher temperatures, the wiper is parked in the depressed parking position as in the prior art.

4 Claims, 2 Drawing Sheets

APPARATUS TO PROVIDE TEMPERATURE CONTROLLED WINDSHIELD WIPER POSITIONS FOR MOTOR VEHICLES

BACKGROUND OF THE INVENTION

This invention relates to automotive windshield wiper systems and more particularly to wiper systems which move the wiper to a parking position, preferably located outside the normal wiping area when the system is switched off.

Prior art German specification DE-OS No. 9 17 324 discloses a circuit for a wiper system in which, during normal wiper operation, the wiper moves between two reversing positions, but when the wiper system is switched off, the wiper enters a "depressed" parking position. In this known circuit arrangement the direction of rotation of an electric motor driving the wiper is changed using a reversing switch each time the wiper reaches one of the reversing positions at the borders of the wiping area. By selecting a different switching point of the reversing switch when the operating switch is turned off, the wiper can be directed to a depressed parking position and the electric motor can thereafter be switched off.

In a first embodiment shown in the prior-art specification, three position switches are assigned to the electric motor and are actuated in the depressed parking position as well as in the two reversing positions. The signals from these position switches are evaluated in a switching stage and are used to control a reversing relay. In a second embodiment disclosed in the prior-art specification, the position switches are replaced by a rotational-speed-sensor and the pulses from this rotational-speed-sensor are evaluated by counters and reference stages.

Such wiper systems in which the wipers enter a depressed parking position located in a gap between the engine compartment hood and the windshield have advantages with respect to styling, aerodynamics and especially to safety because during normal operation of the motor vehicle the windshield wipers are out of the driver's sight in a position which in case of an accident cannot injure any persons involved. Safety is also heightened because in this depressed parking position tension on the windshield wiper and consequently the wiper blade can released so that deformations of the blade in the parking position is avoided which deformations could disadvantageously influence the clearness of the wiped area.

On the other hand such wiper systems also have the disadvantage that in winter the windshield wipers might become blocked due to ice and snow which might not totally be excluded in the gap between the hood and the windshield. The electric wiper motor will be damaged if the wiper leaves the parking position after being switched on, but shortly afterwards is blocked in a position in which it is connected to voltage even when the operating switch is off.

Therefore the object of the present invention is to increase the safety and reliability of such wiper systems using simple means.

This object is achieved according to the invention by including means so that the parking position of the wiper can be changed in dependence on the temperature.

The present invention is based on the idea that the wiper can usually be prevented from being blocked if, during winter, the wiper is prevented from entering the gap between the hood and the windshield. This can be realized most easily by changing the parking position in dependence on the temperature. Above a certain threshold temperature the wiper enters its depressed parking position as disclosed in the prior art. However, in temperatures below the threshold, the parking position is changed so that the wiper is parked outside the gap. The low-temperature parking position preferably corresponds to one of the reversing positions during normal wiper operation. This reduces costs because the wiper motor already includes switch contacts for generating signals at these positions. However, solutions are also possible in which in winter the wiper is deposited between the usual reversing position during normal operation and the usual depressed parking position in higher temperatures.

In a preferred embodiment according to the invention the circuit for controlling the wiper system can automatically move the wiper back and forth between its winter and summer parking positions according to the current temperature. If the wiper is in the depressed (summer) parking position (e.g. in the gap) and the temperature falls below the temperature threshold, the wiper is moved into its winter parking position (e.g. example, the reversing position). Similarly, if the wiper is parked in its winter parking position outside the gap, it automatically enters the gap when the current temperature reaches values above the threshold.

Further, the circuit for controlling the wiper system could be modified to allow the use of a manually actuable switch to select one of the possible parking positions. This gives the driver the option of parking the wiper in the depressed parking position in the gap even in low temperatures, since if it is cold but dry there is no danger of the system getting frozen.

BRIEF DESCRIPTION OF THE DRAWINGS

The invention is described below by way of the embodiment shown in the accompanying drawings, in which.

DETAILED DESCRIPTION OF THE PREFERRED EMBODIMENT

Figure 1:
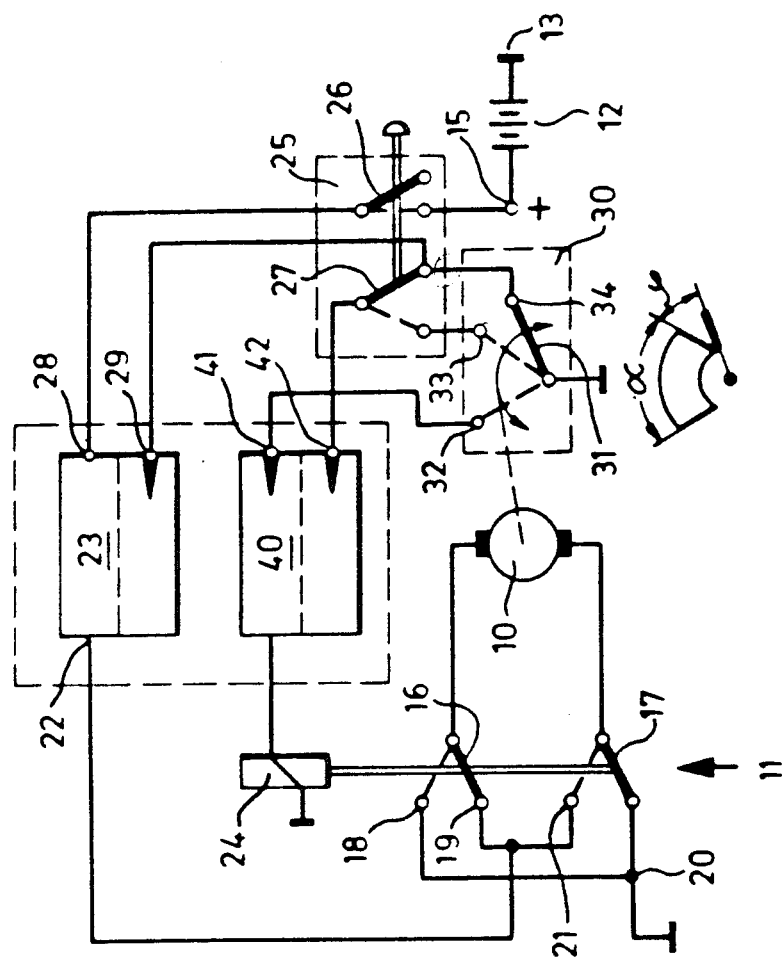
FIG. 1 is a schematic diagram of a wiper system including a depressed parking position as disclosed by the prior art.

Shown in FIG. 1 is a prior art circuit for controlling a windshield wiper system in which the wiper enters the depressed parking position when switched off. An electric motor 10 is supplied by a voltage source 12 having a positive pole 15 and a negative pole or ground 13. The electric motor 10 is connected to two movable bridging contacts 16 and 17 of a reversing relay 11. Two stationary contacts 18 and 20 of relay 11 are interconnected and are joined to ground 13. The two other stationary contacts 19 and 21 are also interconnected and are joined to the output 22 of a main power-on flip-flop 23. The movable bridging contacts 16 and 17 are actuated together via a relay coil 24. A power switch 25 includes a power-on contact 26 and a reversing contact 27 which are actuated together.

A position switch 30 is actuated by the electric motor 10. Switch 30 may be implemented as a movable switching disc having a contact segment 31 which is connected to ground 13 and which cooperates with stationary contacts 32, 33, and 34 to provide signals indicating when the wiper is in certain predetermined positions. Contacts 32 and 33 correspond to the reversing positions of the wiper during normal wiper operation. In FIG. 1, contact segment 31 is illustrated touching stationary contact 34 which corresponds to the wiper's depressed parking position. When the electric motor is operated to turn the wiper around a rotary angle Gamma, contact segment 31 touches stationary contact 33 and generates a first switching signal. This occurs when, during normal wiper operation, the wiper reaches the first reversing position next to the depressed parking position. Similarly, contact segment 31 touches stationary contact 32 when the wiper reaches the other reversing position. In this switching position of the contact segment 31 a second switching signal is generated.

In addition, a reversing flip-flop 40, with a set input 41 and a reset input 42, controls coil 24 of reversing relay 11. The set input 41 is negative-edge sensitive and is connected to stationary contact 32. Reversing contact 27 of power switch 25 can connect the reset input 42 of reversing flip-flop 40 to either contact 33 or contact 34 of position switch 30.

A level-sensitive set input 28 of the main power-on flop 23 is connected to power-on contact 26 of power switch 25. The edge-sensitive reset input 29 of main power-on flip-flop 23 is connected to contact 34 of position switch 30.

In the following operational description of the prior-art circuit of FIG. 1, it is assumed that the two flip-flops 23 and 40 are reset and that therefore relay coil 24 is not excited. The different bridging contacts occupy the switching positions illustrated in the drawing. The wiper starts in the depressed parking position.

When power switch 25 is actuated, set input 28 of main power-on flip-flop 23 is connected to the positive power supply via power-on contact 26. Then output 22 of flip-flop 23 becomes active, supplying positive voltage to electric motor 10 via bridging contact 16 of reversing relay 11. A power stage, such as a relay, may be required to permit flip-flop 23 to supply sufficient current to drive motor 10. The other bridging contact 17 of reversing relay 11 is connected to ground, completing the circuit to provide power to electric motor 10. Reversing contact 27 of power switch 25 is ganged with power-on contact 26 so that it now occupies the position illustrated in broken lines, but this does not affect the output state of reversing flip-flop 40.

The electric motor now rotates counter-clockwise so that after an angle Gamma, contact segment 31 hits stationary contact 33, generating a first switching signal. This switching signal is connected to the reset input 42 of reversing flip-flop 40 via reversing contact 27 of power switch 25, but it does not influence it since reversing flip-flop 40 is already in its reset state. So the direction of rotation of the electric motor remains the same until after the wiper has travelled a rotary angle Alpha and contact segment 31 hits stationary contact 32. At that time a second switching signal is generated which is connected to the set input 41 of reversing flip-flop 40. The reversing flip-flop 40 is thus set exciting relay coil 24 which moves bridging contacts 16 and 11 into the position illustrated in broken lines. This reverses the voltage supplied to the electric motor 10, causing the motor to rotate in the opposite direction.

When contact segment 31 hits stationary contact 33 again, the first switching signal is generated, resetting the reversing flip-flip 40. This deenergizes reversing relay 24 and the direction of rotation of motor 10 is again reversed. This process repeats continuously as long as power switch 25 remains switched on. The wipers move between the two reversing positions within the wiping area. The reversing positions are those points at which contact segment 31 meets stationary contacts 32 or 33, respectively generating signals to set or reset the reversing flip-flop 40.

If the wiper system is now switched off, returning power-on contact 26 and reversing contact 27 to the position shown in FIG. 1, the output states of flip-flops 23 and 40 initially remain unchanged. Main power-on flip flop 23 remains set so that the electric motor 10 continues rotating in its present direction. Because reversing contact 27 is in the position shown in FIG. 1, there is no longer a connection between stationary contact 33 and the reset input 42 of reversing flip-flop 40. Therefore, when contact segment 31 hits stationary contact 33, the reversing memory 40 is not reset, and the direction of rotation of the electric motor remains unchanged. Thus the wipers continue past contact 33, out of the normal wiping area. When contact segment 31 hits the stationary contact 34, the first switching signal is generated and is connected to the reset input 42 of the reversing switch 40 via reversing contact 27 of power switch 25. This deenergizes reversing relay coil 24. At the same time the main power-on flip-flop 23 is reset, for this switching signal is also connected to the reset input 29. The wiper motor is switched of and the wipers are located in the depressed parking position. In this embodiment the switching point of the reversing relay 11 is changed by turning off power switch 25. When the power switch 25 is in its "on" position, the reversing relay coil 24 is deactivated when contact segment 31 touches stationary contact 33. When the power switch 25 is in its "off" position, reversing relay 24 is only deactivated when contact segment 31 hits stationary contact 34, displaced from contact 33 by rotational angle Gamma. Thus when the operating switch 25 is turned off the possible travel of the electric motor is increased by the angle Gamma.

Figure 2:
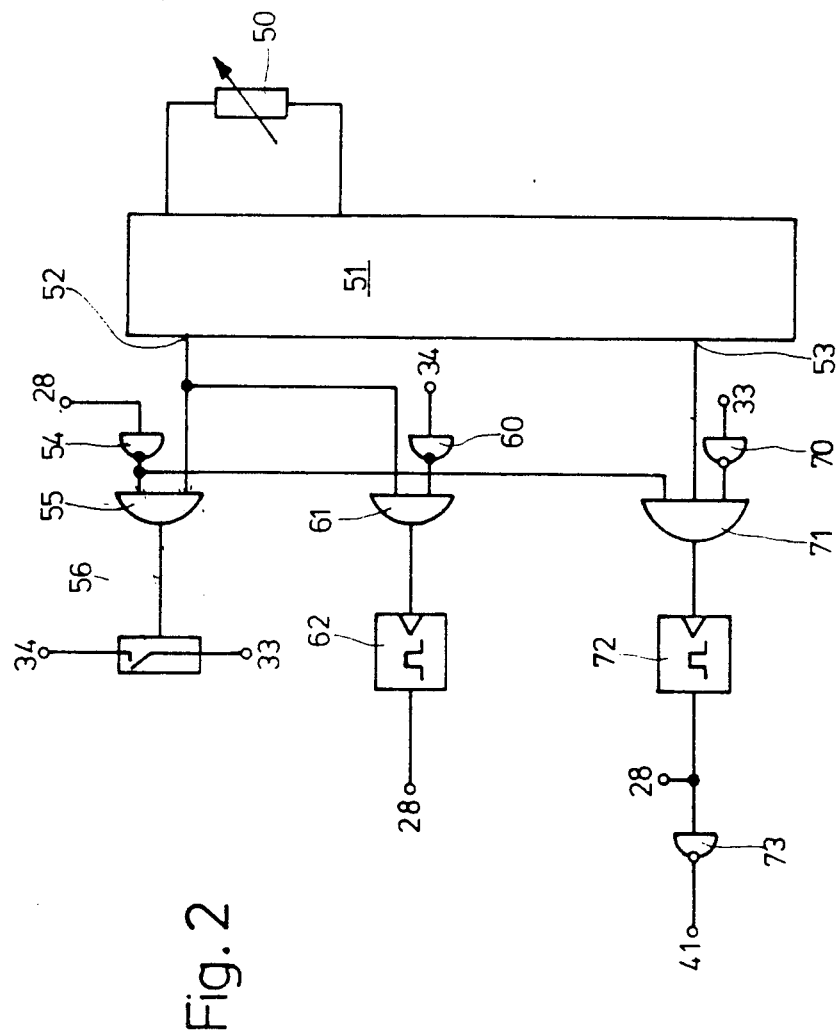
FIG. 2 is a schematic diagram of a modification to the prior art circuit of FIG. 1 to implement the preferred embodiment according to the present invention.

FIG. 2 shows an inventive modification which may be added to the prior-art circuit of FIG. 1 to change the parking position of the wiper in dependence on the temperature. A temperature-sensitive transducer 50, which may be a temperature-sensitive resistor already provided in some motor vehicles for measuring the outdoor temperature, is connected to a comparator 51 with two outputs 52 and 53. "Cold" output 52 of comparator 51 is connected to positive potential when the temperature is below a predetermined threshold temperature of, for example, +5 degrees Celsius. In higher temperatures, however, "warm" output 53 is connected to positive potential, and "cold" output 52 is connected to ground.

The input of an inverter 54 is connected to the set input 28 of main power-on flip-flop 23. As a result, the output of inverter 54 is always high when the power switch 25 is in the "off" position shown in FIG. 1. The output of inverter 54 is connected to one input of AND-Gate 55. The other input of AND-Gate 55 is connected to the "cold" output 52 of comparator 51. The output of AND-Gate 55 drives relay 56. When power switch 25 is "off" and the temperature is below the threshold set by comparator 51, the output of AND-Gate 55 is active, exciting relay 56 to close a pair of contacts between points 33 and 34.

In the prior-art circuit of FIG. 1, wiper operation continues even after power switch 25 is turned off until the wiper reaches the depressed parking position, causing contact segment 31 to touch stationary contact 34, resetting main power on flip-flop 23. In contrast, in the circuit modified according to FIG. 2, the final parking position of the wiper is controlled according to temperature via relay 56. If power switch 25 is switched off and the outdoor temperature is below the threshold, the two stationary contacts 33 and 34 are connected together via relay 56. Thus, when the wiper reaches the reversing position associated with stationary contact 33, the same signal is generated to reset power-on flip-flop 23 as would be generated in the prior art circuit when the wiper reaches the depressed parking position. Consequently in low temperatures the wiper is parked in the reversing position. In temperatures above the threshold, the contacts of relay 56 are open and there is no connection between stationary contacts 33 and 34 so that the wiper stops in the depressed parking position as in the prior art.

In addition to initially parking the wiper in the correct position according to temperature, the circuit according to FIG. 2 automatically adjusts the wiper position as the temperature moves above and below the threshold. If the wiper is currently parked in the depressed parking position, and the temperature drops below the threshold, inverter 60, AND-Gate 61 and pulse generator 62 automatically return the wiper to the reversing position. The input of inverter 60 is connected to stationary contact 34 which is connected to ground only when the wiper is in the depressed parking position. The output of inverter 60 is connected to one input of AND-Gate 61. The other input of AND-Gate 61 is connected to the "cold" output of comparator 51. The output of pulse generator 62 is connected to the set input of main power-on flip-flop 23. If the wiper is in the depressed parking position and the temperature drops below the threshold, the output of AND-Gate 61 becomes active, triggering pulse generator 62. Pulse generator 62 produces a short pulse (effectively simulating a brief actuation of the power switch 25) to set main power-on flip-flop 23, enabling wiper motor 10. Consequently the wiper leaves the depressed parking position and begins moving toward the reversing position. At low temperatures, relay 56 provides a connection between stationary contacts 33 and 34. When the wiper reaches the reversing position, contact segment 31 hits stationary contact 33 generating a signal to trigger the reset input 29 of main power on flip-flop 23. Thus the wiper is now parked in the reversing position.

Similarly, if the wiper is currently parked in the reversing position, and the temperature rises above the threshold, inverter 70, three-input AND-Gate 71, pulse generator 12 and inverter 73 automatically return the wiper to the depressed parking position. The input of inverter 70 is connected to stationary contact 33 of position switch 30. The output of inverter 70 is connected to one input of AND-Gate 71, so that this input is active only when the wiper is in the reversing position. A second input of AND-Gate 71 is connected to the output of inverter 54 which output is active only when power switch 25 is "off". A third input of AND-Gate 71 is connected to the "warm" output 53 of temperature comparator 51 which is active only when the temperature is above the threshold. The output of AND-Gate 71 is connected to the input of pulse generator 72, and to the input of inverter 73. The output of inverter 73 is connected to set input 41 of reversing flip-flop 40. When power switch 25 is off, the wiper is parked in the reversing position, and the outdoor temperature is above the threshold, the output of AND-Gate 71 is active, triggering pulse generator 72. Pulse generator 72 produces a short pulse (effectively simulating a brief actuation of the power switch 25) to set main power-on flip-flop 23, enabling wiper motor 10. Simultaneously, set input 41 of reversing memory 40 is also triggered via inverter 73 so that relay 11 is excited and the electric motor 10 rotates in reverse. Consequently the wiper is moved from the reversing position into the depressed parking position. When the wiper reaches this position, contact segment 31 touches stationary contact 34, resetting main power-on flip-flop 23 and disabling motor 10. Thus, the wiper now remains parked at the depressed parking position.

Thus, an embodiment according to the invention has been disclosed in which the parking position of the wiper can be changed in dependence on the temperature. In the preferred embodiment the wiper is parked in the reversing position in temperatures below a certain temperature threshold. In addition, the wiper automatically adjusts to the correct parking position depending on the current outdoor temperature without requiring any action by the driver.

The present invention has been described using an embodiment presupposing a reversible wiper motor. However, the objects of the invention can also be realized in applications in which the wiper motor rotates only in one direction and the pendulum motion of the wiper is generated via a crank gearing. Further, the invention has been described using an embodiment presupposing a depressed parking position. The objects of the invention could similarly be realized in applications in which the wiper always moves back and forth between two reversing positions and in which it does not leave this wiping area even while entering the parking position. For example, systems are possible in which the wiper enters the gap between the hood and the windshield for short time even during normal wiper operation.

The invention has been explained using an embodiment in which two different parking positions are possible. However, a system in which the parking position can continuously be changed in dependence on the temperature is within the scope of the invention.

What is claimed is:

1. A wiper system for motor vehicles comprising at least one wiper means moveable to and fro within a wiping area between two reversing positions and stoppable in a parking position when the wiper system is switched off, and temperature-sensitive means for changing the parking position of the wiper means in dependence on the temperature.

2. A wiper system according to claim 1, wherein at temperatures below a predetermined threshold temperature the wiper means is parked in a position corresponding to one of said reversing position and at temperatures above said predetermined threshold temperature said wiper means is deposited in a depressed parking position.

3. A wiper system according to claim 1 wherein said temperature-sensitive means automatically moves the wiper means between a parking position for low temperatures and a parking position for high temperatures.

4. A wiper system according to claim 3 further comprising arbitrarily actuable switch means for selecting one of the possible parking positions beforehand in dependence on the temperature.

* * * * *